United States Patent

Hoshino

(10) Patent No.: US 10,462,353 B2
(45) Date of Patent: Oct. 29, 2019

(54) IMAGING DEVICE, IMAGING METHOD, AND STORAGE MEDIUM

(71) Applicant: CASIO COMPUTER CO., LTD., Shibuya-ku, Tokyo (JP)

(72) Inventor: Hiroyuki Hoshino, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/727,247

(22) Filed: Oct. 6, 2017

(65) Prior Publication Data

US 2018/0160031 A1 Jun. 7, 2018

(30) Foreign Application Priority Data

Dec. 5, 2016 (JP) ................................. 2016-235540

(51) Int. Cl.
| | |
|---|---|
| H04N 5/232 | (2006.01) |
| H04N 1/21 | (2006.01) |
| G06F 3/0488 | (2013.01) |
| H04N 5/77 | (2006.01) |
| H04N 5/783 | (2006.01) |
| H04N 9/804 | (2006.01) |

(52) U.S. Cl.
CPC ..... *H04N 5/23216* (2013.01); *G06F 3/04883* (2013.01); *H04N 1/215* (2013.01);
(Continued)

(58) Field of Classification Search
CPC .... H04N 5/23216; H04N 5/783; H04N 1/215; H04N 5/232939; H04N 5/772;
(Continued)

(56) References Cited

U.S. PATENT DOCUMENTS

| | | | | |
|---|---|---|---|---|
| 9,967,457 | B1* | 5/2018 | Matias | G11B 27/10 |
| 2003/0189647 | A1* | 10/2003 | Kang | H04N 5/232 |
| | | | | 348/207.99 |

(Continued)

FOREIGN PATENT DOCUMENTS

| | | | |
|---|---|---|---|
| JP | 2000125183 A | 4/2000 | |
| JP | 2006080809 A | 3/2006 | |

(Continued)

OTHER PUBLICATIONS

Japanese Office Action (and English language translation thereof) dated Jul. 30, 2019 issued in counterpart Japanese Application No. 2016-235540.

*Primary Examiner* — Timothy J Henn
(74) *Attorney, Agent, or Firm* — Holtz, Holtz & Volek PC (57) ABSTRACT

An imaging device includes the following. A temporary storage cyclically stores images for a predetermined duration or number imaged in succession. A record controller records temporarily stored images for a first duration or a first number of images before detection of the capturing instruction, and records images for a second duration or a second number of images after detection of the capturing instruction. A setter preliminarily determines a total duration of the first duration and the second duration or a total number of the first number and the second number and determines a ratio of the first duration to the second duration or a ratio of the first number to the second number in response to one type of operation of an operational input unit, while retaining the preliminarily determined total duration or the preliminarily determined total number.

15 Claims, 5 Drawing Sheets

(52) U.S. Cl.
CPC ....... *H04N 1/2112* (2013.01); *H04N 5/23293* (2013.01); *H04N 5/232939* (2018.08); *H04N 5/772* (2013.01); *H04N 5/783* (2013.01); *H04N 9/8042* (2013.01)

(58) Field of Classification Search
CPC ............. H04N 1/2112; H04N 5/23293; H04N 9/8042; G06F 3/04883
See application file for complete search history.

(56) References Cited

U.S. PATENT DOCUMENTS

| | | | | |
|---|---|---|---|---|
| 2006/0050997 | A1* | 3/2006 | Imamura | H04N 1/2112 |
| | | | | 382/312 |
| 2007/0046785 | A1* | 3/2007 | Matsumoto | H04N 5/232 |
| | | | | 348/222.1 |
| 2010/0214439 | A1* | 8/2010 | Oshima | G03B 7/08 |
| | | | | 348/229.1 |
| 2011/0043651 | A1* | 2/2011 | Nonaka | H04N 5/23219 |
| | | | | 348/220.1 |
| 2011/0293244 | A1* | 12/2011 | Kuriyama | H04N 5/23245 |
| | | | | 386/248 |
| 2013/0114938 | A1* | 5/2013 | Kuriyama | H04N 5/23212 |
| | | | | 386/225 |
| 2015/0262616 | A1* | 9/2015 | Jaime | G11B 27/034 |
| | | | | 386/228 |

FOREIGN PATENT DOCUMENTS

| | | | |
|---|---|---|---|
| JP | 2010130327 | A | 6/2010 |
| JP | 2014107777 | A | 6/2014 |

\* cited by examiner

IMAGING DEVICE, IMAGING METHOD, AND STORAGE MEDIUM

CROSS-REFERENCE TO RELATED APPLICATIONS

This application is based upon and claims the benefit of priority from the prior Japanese Patent Application No. 2016-235540, filed on Dec. 5, 2016, the entire contents of which are incorporated herein by reference.

BACKGROUND OF THE INVENTION

1. Field of the Invention

The present invention relates to imaging device, imaging method, and storage medium.

2. Description of the Related Art

A typical imaging device temporarily cyclically stores images imaged in succession and allows a user to acquire an image at a crucial moment and those leading up to the crucial moment. Japanese Unexamined Patent Application Publication No. 2014-107777 discloses a technique that allows a user to continuously acquire images following a crucial moment and combine these images into a single one.

BRIEF SUMMARY OF THE INVENTION

According to an aspect of the present invention, there is provided an imaging device including: a temporary storage which temporarily cyclically stores images for a predetermined duration or a predetermined number of images imaged in succession through an imager; a detecting unit which detects a capturing instruction; a record controller which records in a recorder temporarily stored images for a first duration or a first number of images before detection of the capturing instruction at the detecting unit, and records in the recorder images for a second duration or a second number of images imaged in succession through the imager after detection of the capturing instruction; and a setter which preliminarily determines a total duration of the first duration and the second duration or a total number of the first number and the second number and determines a ratio of the first duration to the second duration or a ratio of the first number to the second number in response to one type of operation of an operational input unit, while retaining the preliminarily determined total duration or the preliminarily determined total number.

According to another aspect of the present invention, there is provided an imaging device including: a temporary storage which temporarily cyclically stores images for a predetermined duration or a predetermined number of images imaged in succession through an imager; a detecting unit which detects a capturing instruction; a record controller which records in a recorder temporarily stored images for a first duration or a first number of images before detection of the capturing instruction at the detecting unit, and which records in the recorder images for a second duration or a second number of images imaged in succession through the imager after detection of the capturing instruction; and a setter which preliminarily determines a ratio of the first duration to the second duration or a ratio of the first number to the second number and determines a total duration of the first duration and the second duration or a total number of the first number and the second number in response to one type of operation of an operational input unit, while retaining the preliminarily determined ratio of the durations or numbers.

According to another aspect of the present invention, there is provided an imaging method using an imaging device equipped with a temporary storage which temporarily cyclically stores images for a predetermined duration or a predetermined number of images imaged in succession by an imager, the imaging method including: detecting a capturing instruction; recording in a recorder temporarily stored images for a first duration or a first number of images before detection of the capturing instruction at the detecting unit, and recording in the recorder images for a second duration or a second number of images imaged in succession through the imager after detection of the capturing instruction; preliminarily determining a total duration of the first duration and the second duration or a total number of the first number and the second number; and determining a ratio of the first duration to the second duration or a ratio of the first number to the second number in response to one type of operation of an operational input unit while retaining the preliminarily determined total duration or the preliminarily determined total number.

According to another aspect of the present invention, there is provided an imaging method using an imaging device equipped with a temporary storage which temporarily cyclically stores images for a predetermined duration or a predetermined number of images imaged in succession by an imager, the imaging method including: detecting a capturing instruction; recording in a recorder temporarily stored images for a first duration or a first number of images before detection of the capturing instruction at the detecting unit, and recording in the recorder images for a second duration or a second number of images imaged in succession through the imager after detection of the capturing instruction; preliminarily determining a ratio of the first duration to the second duration or a ratio of the first number to the second number; and determining a total duration of the first duration and the second duration or a total number of the first number and the second number in response to one type of operation of an operational input unit while retaining the preliminarily determined ratio of the durations or numbers.

According to another aspect of the present invention, there is provided a non-transitory computer-readable storage medium having stored thereon a program executable by a computer in an imaging device, the computer being equipped with a temporary storage which temporarily cyclically stores images for a predetermined duration or a predetermined number of images captured in succession by an imager, the program controlling the computer to perform functions including: detecting a capturing instruction; recording in a recorder temporarily stored images for a first duration or a first number of images before detection of the capturing instruction at the detecting unit, and recording in the recorder images for a second duration or a second number of images imaged in succession through the imager after detection of the capturing instruction; and preliminarily determining a total duration of the first duration and the second duration or a total number of the first number and the second number and determining a ratio of the first duration to the second duration or a ratio of the first number to the second number in response to one type of operation of an operational input unit, while retaining the preliminarily determined total duration or the preliminarily determined total number.

According to another aspect of the present invention, there is provided a non-transitory computer-readable storage medium having stored thereon a program executable by a computer in an imaging device, the computer being equipped with a temporary storage which temporarily cyclically stores images for a predetermined duration or a predetermined number of images imaged in succession by an imager, the program controlling the computer to perform functions including: detecting a capturing instruction; recording in a recorder temporarily stored images for a first duration or a first number of images before detection of the capturing instruction at the detecting unit, and recording in the recorder images for a second duration or a second number of images imaged in succession through the imager after detection of the capturing instruction; and preliminarily determining a ratio of the first duration to the second duration or a ratio of the first number to the second number and determining a total duration of the first duration and the second duration or a total number of the first number and the second number in response to one type of operation of an operational input unit, while retaining the preliminarily determined ratio of the durations or numbers.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

The present invention will now be described with reference to the drawings. These drawings however should not be construed to limit the scope of the invention.

Figure 1:
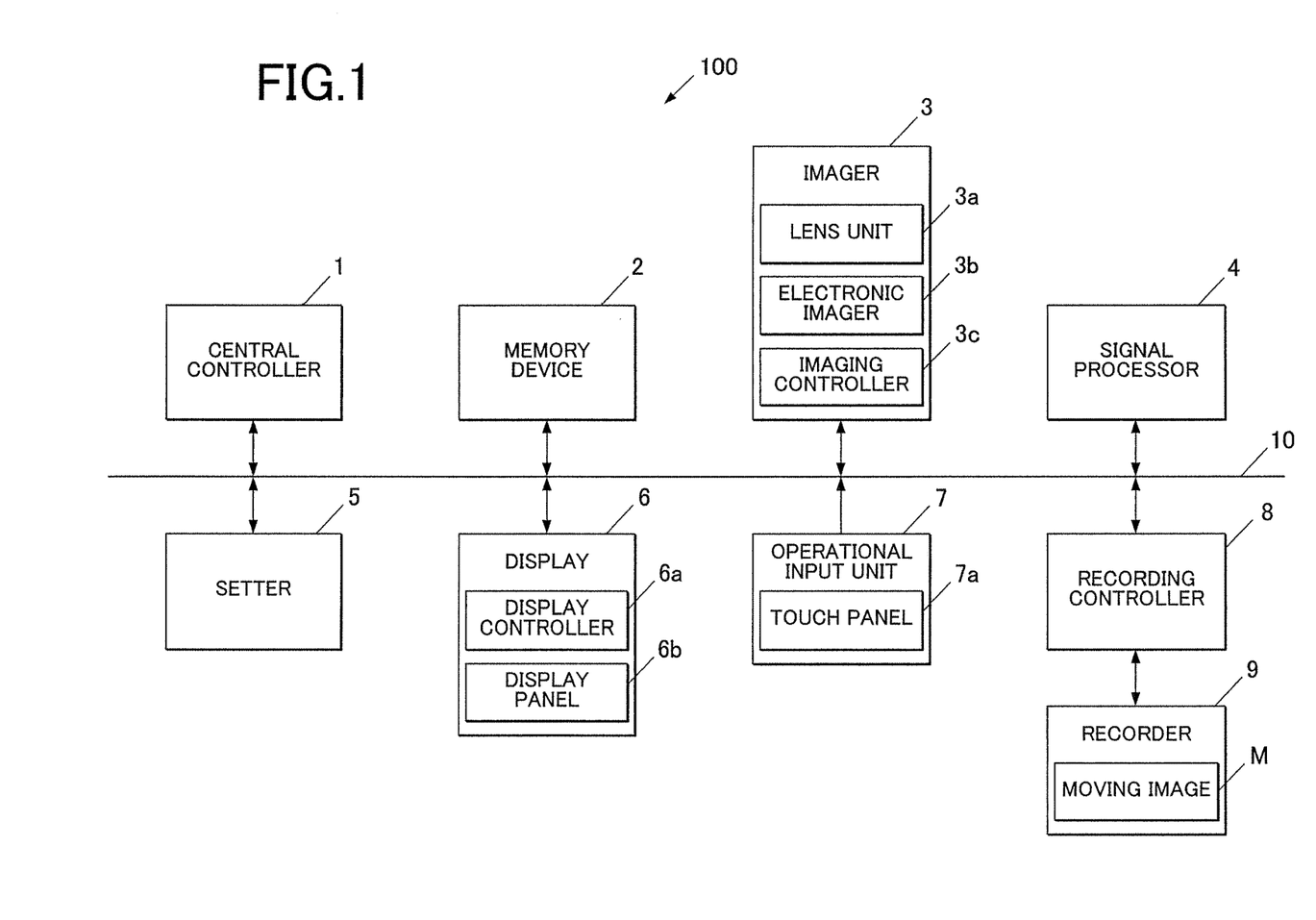
FIG. 1 is a block diagram illustrating the configuration of an imaging device according to an embodiment of the present invention.

FIG. 1 is a block diagram illustrating the configuration of an imaging device 100 according to an embodiment of the present invention.

As shown in FIG. 1, the imaging device 100 according to this embodiment includes a central controller 1, a memory device 2, an imager 3, a signal processor 4, a setter 5, a display 6, an operational input unit 7, a recording controller 8, and a recorder 9.

The central controller 1, the memory device 2, the imager 3, the signal processor 4, the setter 5, the display 6, the operational input unit 7, and the recording controller 8 are connected via a bus line 10.

The central controller 1 controls each unit of the imaging device 100. More specifically, the central controller 1 includes a processor (not shown) and performs control operations according to processing programs (not shown) for the imaging device 100.

The memory device 2 includes, for example, dynamic random access memory (DRAM) and temporarily stores data processed by the central controller 1 and/or the setter 5.

The memory device (temporarily storing means) 2 includes, for example, a temporary storage area that includes a ring buffer and temporarily cyclically stores frame images imaged in succession at the imager 3 for a predetermined duration or in a predetermined number. More specifically, the memory device 2 acquires image data (YUV data) generated at the signal processor 4 of frame images imaged in succession at the imager 3, for example, at a predetermined frame rate of 120 fps, and temporarily stores image data of frame images for the predetermined duration or in a predetermined number in a chronological order.

Alternatively, the memory device 2 may include a temporary storage area for temporarily cyclically storing image data (YUV data) generated at the signal processor 4 of frame images imaged in succession at the imager 3, for example, at a predetermined frame rate of 120 fps after a capturing instruction.

The imager 3 images a subject, for example, at a frame rate of 120 fps to generate frame images. More specifically, the imager 3 includes a lens unit 3a, an electronic imager 3b, and an imaging controller 3c.

The lens unit 3a includes, for example, lenses, such as zoom and focus lenses, and a diaphragm for adjusting the amount of light propagating through the lenses.

The electronic imager 3b, includes, for example, imaging sensors (imaging elements), such as charge coupled devices (CCDs) and complementary metal-oxide semiconductors (CMOSs). The electronic imager 3b converts optical images propagating through each lens in the lens unit 3a into two-dimensional image signals.

The imaging controller 3c instructs a timing generator or driver, for example, to drive the electronic imager 3b and then instructs the electronic imager 3b to convert an optical image passing through the lens unit 3a into two-dimensional image signals in a predetermined cycle, read a frame image from the imaging area of the electronic imager 3b for each screen, and output the read frame image to the signal processor 4.

The imaging controller 3c may control adjustment of conditions for imaging a subject, such as automatic focusing (AF), automatic exposure (AE), and automatic white balancing (AWB).

The signal processor 4 performs image processing on analog signals for the frame images sent from the electronic imager 3b. More specifically, the signal processor 4 adjusts the gain of each color component (RGB) for the analog signals for the frame images, sample-holds the analog signals with a sample-hold circuit (not shown), converts the sample-held analog signals into digital data with an A/D converter (not shown), performs color processing, including pixel interpolation and γ correction, with a color processing circuit (not shown), and generates digital luminance signals Y and digital color-difference signals Cb and Cr (YUV data). The signal processor 4 outputs the generated luminance signals Y and color-difference signals Cb and Cr to the memory device 2, which functions as buffer memory.

The setter 5 determines the total of the first duration (described below) and the second duration (described below) and the ratio of the first duration to the second duration.

The setter 5 includes, for example, a predetermined logic circuit, which is an exemplary configuration, and may have any other configuration.

The first duration is a time interval for acquiring frame images imaged at the imager 3 and temporarily stored in the memory device 2 before a capturing instruction is detected by the central controller (detecting means) 1 through, for example, a predetermined user operation of the operational input unit 7 (for example, the operation of a movie button). The first duration may be a time along a temporal axis in the negative (past) direction from the capturing instruction detecting time as the reference.

The second duration is a time interval for acquiring frame images imaged by the imager 3 after a capturing instruction is detected by the central controller (detecting means) 1 through, for example, a pre-determined user operation of the operational input unit 7 (for example, the operation of a movie button). The second duration may be a time (elapse time) along a temporal axis in the positive (future) direction from a capturing instruction detecting time as the reference.

The setter 5 determines the ratio of the first duration to the second duration while retaining the total of the first and second durations or determines the total of the first and second durations while retaining the ratio of the first duration to the second duration in response to a single predetermined operation of the operational input unit 7 by a user.

Figure 2A:
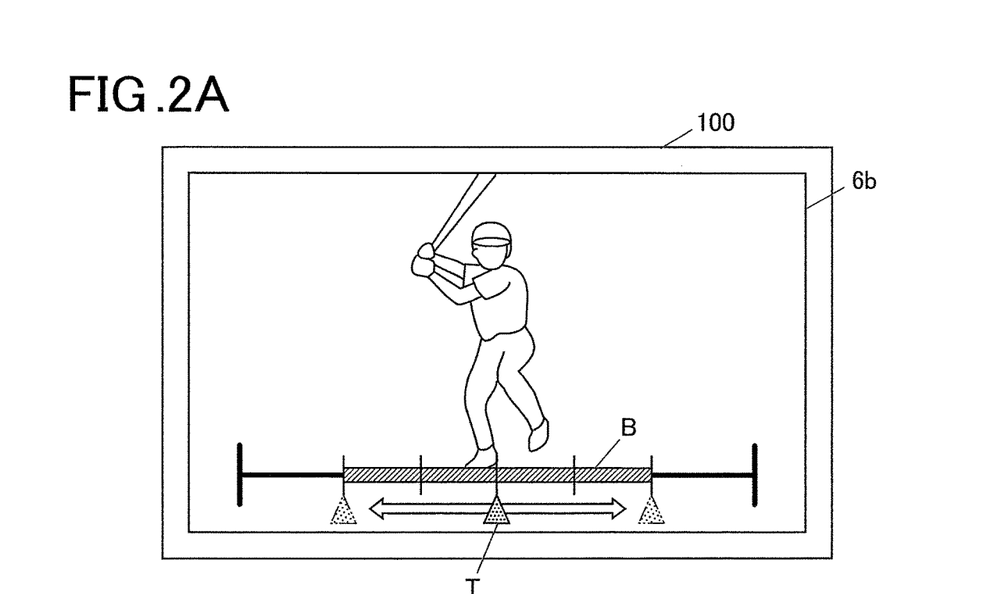
FIG. 2A illustrates an exemplary method for setting the ratio of a first duration to a second duration and the total of the first and second durations in the imaging device shown in FIG. 1.
Figure 2B:
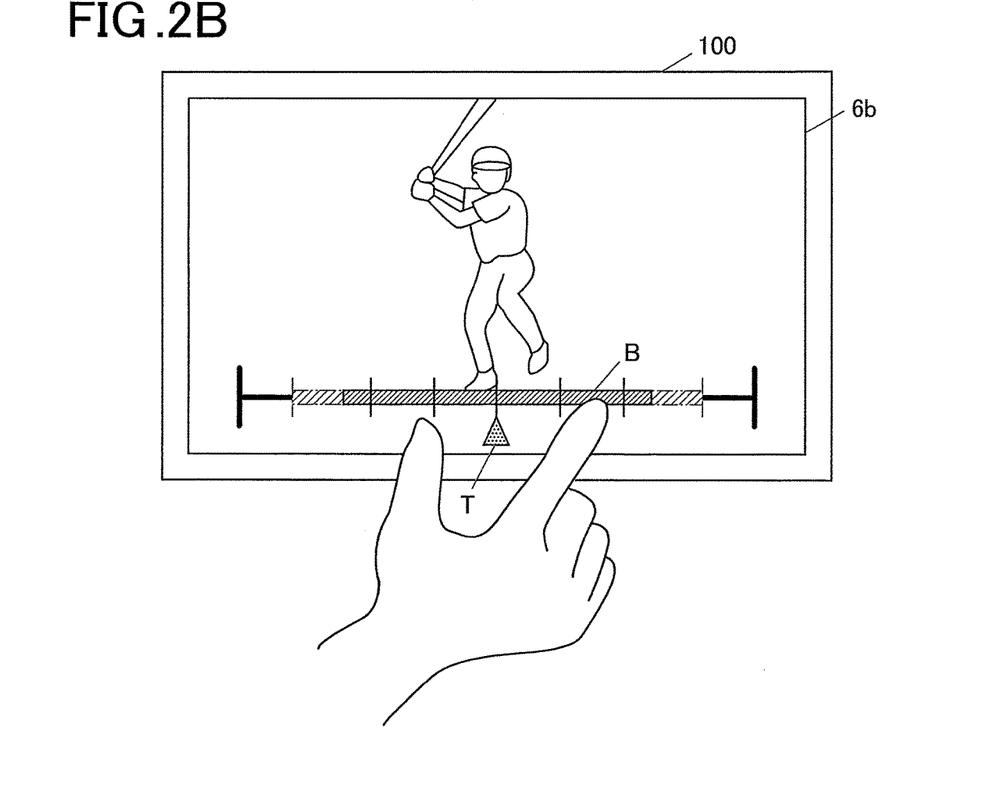
FIG. 2B illustrates another exemplary method for setting the ratio of a first duration to a second duration and the total of the first and second durations in the imaging device shown in FIG. 1.

With reference to FIGS. 2A and 2B, an exemplary method for setting the ratio of the first duration to the second duration and the total of the first and second durations will now be described.

For example, when an instruction is issued to execute a mode to set a ratio of the first duration to the second duration and/or the total of the first and second durations in response to a predetermined operation of the operational input unit 7 by a user, a slide bar B appears on the screen (on-screen display) in a display panel 6b (described below) of the display 6 (see FIG. 2A). The length of the slide bar B represents the total of the first and second durations.

The setter 5 can modify a ratio of the first duration to the second duration while retaining the total of the first and second durations, for example, by pressing the horizontal segments of a cross button (described below) on the operational input unit 7 or moving the substantially triangular slider (operator) T to each of the positions determined by nearly quartering the slide bar B through a swiping operation on the touch panel 7a (described below) (see FIG. 2A). For example, moving the slider T to the leftmost vertical line of the slide bar B causes the setter 5 to set the first duration to 0/4 (i.e., zero hours) and the second duration to 4/4. Moving the slider T to the second leftmost vertical line of the slide bar B causes the setter 5 to set the first duration to 1/4 and the second duration to 3/4. Moving the slider T to the middle vertical line of the slide bar B causes the setter 5 to set the first duration to 2/4 and the second duration to 2/4. Moving the slider T to the second rightmost vertical line of the slide bar B causes the setter 5 to set the first duration to 3/4 and the second duration to 1/4. Moving the slider T to the rightmost vertical line of the slide bar B causes the setter 5 to set the first duration to 4/4 and the second duration to 0/4 (i.e., zero hours).

The setter 5 can modify the total of the first and second durations while retaining the ratio of the first duration to the second duration by the user pressing the vertical segments of the cross button (described below) on the operational input unit 7 or varying the length of the slide bar B through a pinch-out or pinch-in operation (opening or closing two fingers) on the touch panel 7a (described below) (see FIG. 2B). For example, the length of the slide bar B is adjustable to a predetermined number of stages (for example, three stages of "long", "standard" and "short"). A relative decrease in the length of the slide bar B causes the setter 5 to decrease the total of the first and second durations. A relative increase in the length of the slide bar B causes the setter 5 to increase the total of the first and second durations.

The above-mentioned ratio of the first duration to the second duration is a mere example and may be modified as appropriate. For example, the ratio may be such that the first duration is relatively shorter than the second duration (i.e., the second duration is relatively longer than the first duration) or conversely, the first duration is relatively longer than the second duration (i.e., the second duration is relatively shorter than the first duration).

The display 6 includes a display controller 6a and a display panel 6b.

The display controller 6a controls display such that a predetermined image is displayed in a display area of the display panel 6b based on predetermined-sized image data read from the memory device 2 and/or the recorder 9 and decoded by the recording controller 8. More specifically, the display controller 6a includes video random access memory (VRAM), a VRAM controller, and a digital video encoder. The digital video encoder reads luminance signals Y and color-difference signals Cb and Cr decoded by the recording controller 8 and stored in VRAM (not shown) from VRAM via the VRAM controller, for example, at a predetermined reproduction frame rate of 30 fps and generates video signals based on the data, and outputs images to the display panel 6b.

The display panel 6b displays images imaged by the imager 3 in the display area based on the video signals from the display controller 6a.

Examples of the display panel 6b include, but not limited to, liquid crystal display panels and organic electroluminescence (EL) display panels.

The operational input unit 7 performs predetermined operations on the imager 100. More specifically, the operational input unit 7 includes an operation unit including a shutter button (not shown) for instructing the device to capture still images, a movie button (not shown) for instructing the device to capture moving images, and the cross button (not shown) for selecting a capturing mode and/or function.

When a user operates one of the buttons, the operational input unit 7 outputs an operation signal corresponding to the operated button to the central controller 1. The central controller 1 instructs each unit to perform a predetermined operation (for example, capturing moving images) in response to an operation instruction output from the operational input unit 7.

The operational input unit 7 includes the touch panel 7a, which integrates with the display panel 6b of the display 6.

The touch panel 7a detects the direct or indirect contact position of user's finger (hand) or a touch pen with the display screen, which is the display area of the display panel 6b. The touch panel 7a is provided, for example, on the display screen in the display panel 6b or inside the display screen and detects the X and Y coordinates of the contact position on the display screen by an electrostatic capacitance, resistance film or surface acoustic wave scheme in a predetermined sampling cycle. The touch panel 7a outputs position signals on the X and Y coordinates of the contact position to the setter 5 and/or the central controller 1.

The recording controller 8 controls the reading of data from the recorder 9 and the writing of data to the recorder 9.

More specifically, the recording controller 8 instructs the recorder 9, which includes, for example, a non-volatile memory (flash memory) or recording media, to compress (code) image data of moving or still images in a predetermined compression format, such as MPEG, M-JPEG or JPEG, for recording.

In a videographic capturing process that involves combination of, for example, frame images before and after a capturing instruction into a single moving image M, the recording controller (record controlling means) 8 records in the recorder 9 the first-duration frame images F1a for the first duration among the frame images for a predetermined duration temporarily stored in the memory device 2 at the time of detection of a capturing instruction and the second-duration frame images F2a imaged in succession at the imager 3 after detection of a capturing instruction.

Figure 4:
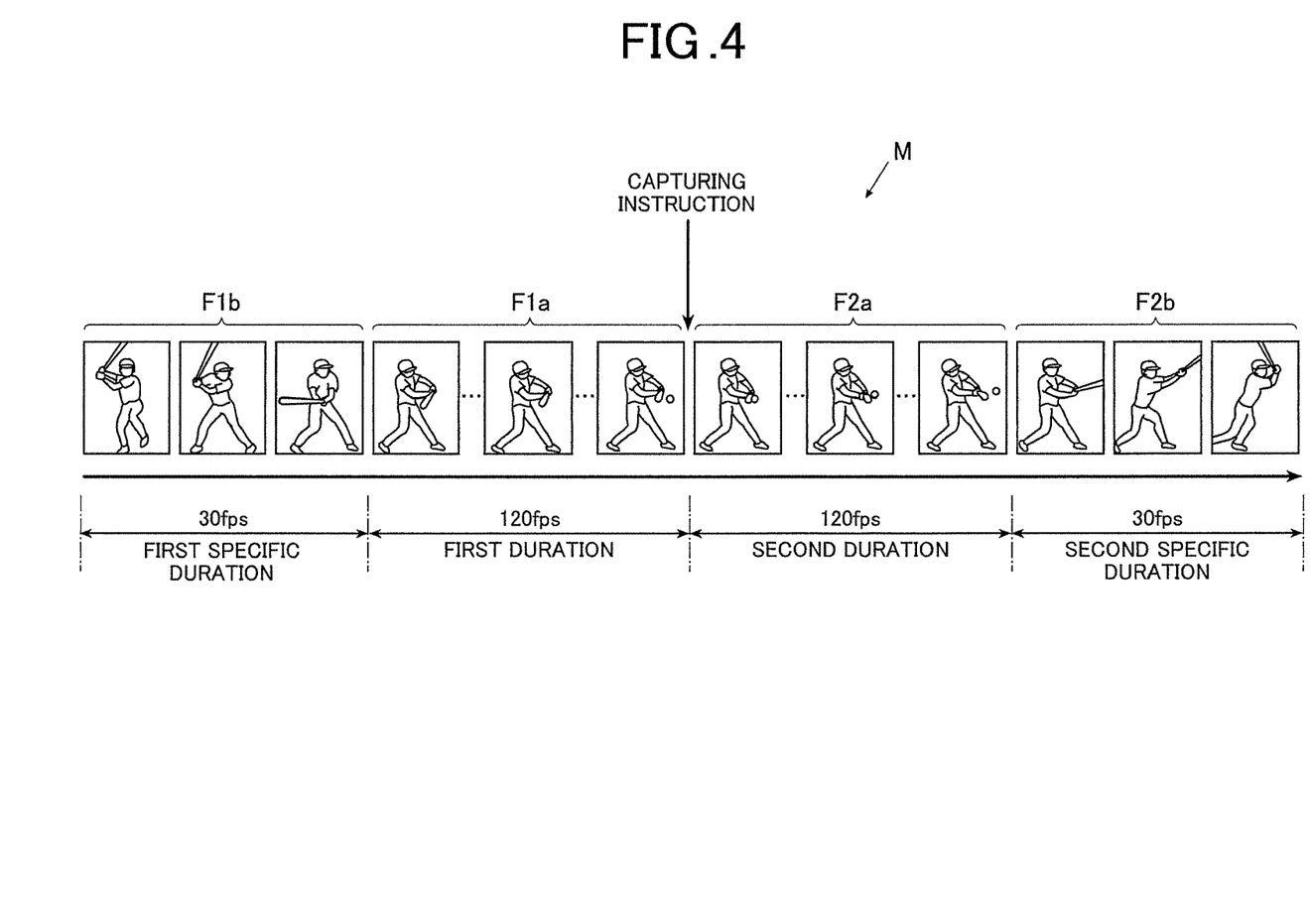
FIG. 4 illustrates the videographic capturing process shown in FIG. 3.

More specifically, the recording controller 8 controls recording such that the frame images F1a for the first duration from a capturing instruction detecting time to a time point a first duration before, the frame images F1b for a first specific duration from the time point the first duration before to a time point a first specific duration before, the frame images F2a for the second duration from the capturing instruction detecting time to a time point a second duration after, and the frame images F2b for a second specific duration from the time point the second duration after to a time point a second specific duration after are recorded in the recorder 9 (See FIG. 4).

The recording controller 8 performs different processes between the first-duration frame images F1a and the first specific-duration frame images F1b. More specifically, the recording controller 8 records the first-duration frame images F1a in the recorder 9 at shorter intervals than the first specific-duration frame images F1b. The recording controller 8 performs different processes between the second-duration frame images F2a and the second specific-duration frame images F2b. More specifically, the recording controller 8 records the second-duration frame images F2a in the recorder 9 at shorter intervals than the second specific-duration frame images F2b.

Before detection of a capturing instruction, the memory device 2 has image data, generated at the signal processor 4 and temporarily cyclically stored in a quantity corresponding to a predetermined duration, of the frame images imaged in succession at the imager 3 at a predetermined frame rate of 120 fps.

When the central controller 1 detects a capturing instruction through a predetermined operation of the operational input unit 7 by a user (for example, the operation of the movie button), the recording controller 8 retrieves all the frame images temporarily stored from the memory device 2. The recording controller 8 retrieves the frame images F1a for the first duration from the capturing instruction detecting time to a time point a first duration before from the memory device 2 and the frame images F1b for the first specific duration from the time point the first duration before to the time point the first specific duration before. The recording controller 8 decimates the retrieved first specific-duration frame images F1b such that a time interval for the reproduction frame rate corresponding to a frame rate of 30 fps can be achieved.

After detection of the capturing instruction, the memory device 2 temporarily stores image data generated at the signal processor 4 of frame images imaged in succession at the imager 3 at a predetermined frame rate of 120 fps in a chronological order until elapse of the total of the second and second specific durations. The recording controller 8 retrieves the frame images F2a for the second duration from the capturing instruction detecting time to the time point the second duration after from the memory device 2 and further retrieves the frame images F2b for the second specific duration from the time point the second duration after to the time point the second specific duration after. The recording controller 8 decimates the retrieved second specific-duration frame images F2b such that a time interval for the reproduction frame rate corresponding to a frame rate of 30 fps can be achieved.

The recording controller 8 combines the first specific-duration frame images F1b with the time interval corresponding to a frame rate of 30 fps, the first-duration frame images F1a and the second-duration frame images F2a, each having the time interval corresponding to a frame rate of 120 fps, and the second specific-duration frame images F2b having the time interval corresponding to a frame rate of 30 fps into a single moving image M and records the combined moving image M in the recorder 9.

In other words, the recording controller 8 records the first-duration frame images F1a and the second-duration frame images F2a in the recorder 9 at first identical time intervals and records the first specific-duration frame images F1b and the second specific-duration frame images F2b in the recorder 9 at second identical time intervals.

The time interval for the first-duration frame images F1a and the second-duration frame images F2a (time interval corresponding to 120 fps, for example) is a mere example and may be modified as appropriate. Similarly, the time interval for the first specific-duration frame images F1b and the second specific-duration frame images F2b (time intervals corresponding to 30 fps, for example) is a mere example and may be modified as appropriate.

<Videographic Capturing Process>

The videographic capturing process of the imaging device 100 will now be described with reference to FIGS. 3 and 4.

Figure 3:
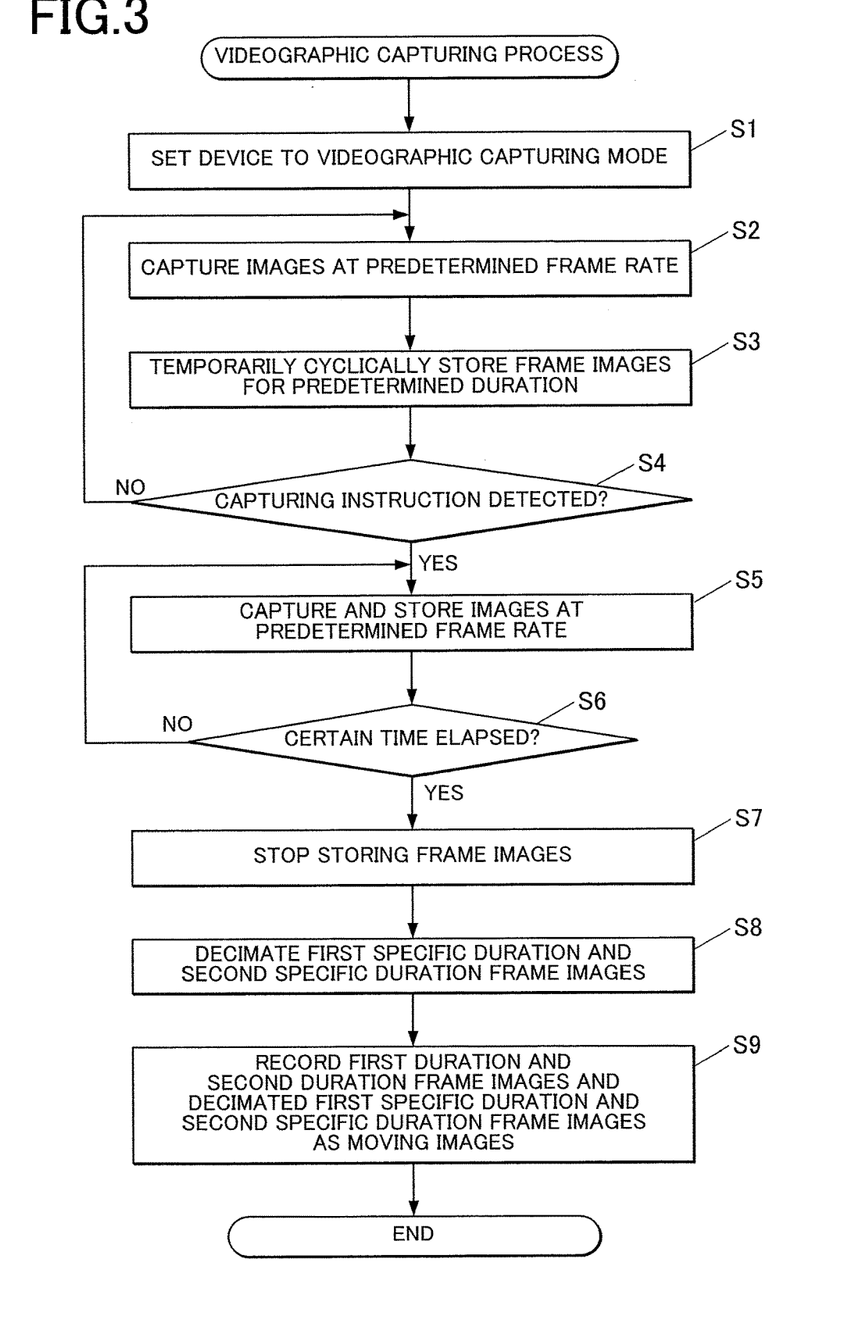
FIG. 3 is a flowchart illustrating exemplary operations in a videographic capturing process of the imaging device shown in FIG. 1.

FIG. 3 is a flowchart illustrating exemplary operations in the videographic capturing process. FIG. 4 illustrates the videographic capturing process and schematically shows frame images F1a, F1b, F2a, and F2b of a moving image M.

Before the start of the videographic capturing process described below, the user presets the total of the first and second durations and the ratio of the first duration to the second duration to appropriate values. For example, the total value is preset to a standard one and the first duration is set to 2/4 and the second duration is set to 2/4. The predetermined frame rate for moving images is, for example, 120 fps.

With reference to FIG. 3, the processor in the central controller 1 establishes the imaging device to a videographic capturing mode that involves combination of frame images before and after a capturing instruction into a single moving image M in response to, for example, a predetermined operation of the operational input unit 7 by a user (STEP S1).

The imaging controller 3c in the imager 3 instructs the electronic imager 3b to capture a subject at the predetermined imaging timing for moving images corresponding to a predetermined frame rate of 120 fps using pixels in the imaging area of the electronic imager 3b and convert the optical image into two-dimensional image signals. The signal processor 4 performs several image processing operations on the analog signals sent from the electronic imager 3b, generates image data of the frame images, and outputs the image data to the memory device 2 (STEP S2).

The memory device 2 temporarily cyclically stores the image data of frame images for a predetermined duration in a chronological order (STEP S3).

The processor in the central controller 1 checks for detection of a capturing instruction based on a predetermined operation of the operational input unit 7 by a user (for example, the operation of the movie button) (STEP 4).

If the processor in the central controller 1 determines that no capturing instruction is detected (STEP 4: NO), the processor in the central controller 1 returns to STEP S2, at which frame images are captured at a predetermined frame rate and image data of the frame images is temporarily stored in the memory device 2, as shown above.

If a capturing instruction is detected (STEP S4: YES) at STEP S4, the imager 3 captures frame images at a predetermined frame rate of 120 fps, similar to STEPS S2 and S3, the signal processor 4 generates image data of frame images, and the memory 2 temporarily stores the image data of the frame images in a chronological order (STEP S5).

After the detection of a capturing instruction, the processor in the central controller 1 determines whether or not a certain period, for example, the total of the second and second specific durations, has elapsed (STEP S6).

If the processor determines that the certain period has not elapsed (STEP S6: NO), the processor in the central controller 1 returns to STEP S5, at which frame images are captured at a predetermined frame rate, similar to the above, and the image data of the frame images are temporarily stored in the memory device 2.

If the processor determines that the certain period has elapsed at STEP S6 (STEP S6: YES), the processor in the central controller 1 stops temporarily storing the image data of the frame images in the memory device 2 (STEP S7).

The recording controller 8 retrieves all the frame images temporarily stored from the memory device 2 and decimates the first specific-duration frame images F1b and the second specific-duration frame images F2b such that the time interval corresponding to a frame rate of 30 fps can be achieved (STEP S8). The recording controller 8 then combines the decimated first specific-duration frame images F1b, the first-duration frame images F1a, the second-duration frame images F2a, and the decimated second specific-duration frame images F2b into a single moving image M and instructs the recorder 9 to record the single moving image M (STEP S9).

The videographic capturing process is thereby completed.

In the above videographic capturing process, the recording controller 8 retrieves all the frame images from the memory device 2 and then decimates the first specific-duration frame images F1b and the second specific-duration frame images F2b (STEP S8) and instructs the recorder 9 to record the single moving image M (STEP S9). Alternatively, the recording controller 8 may sequentially acquire frame images during capturing, decimate frame images F1b and F2b which need to be decimated and instruct the recorder 9 to sequentially record the decimated frame images F1b and F2b, and instruct the recorder 9 to sequentially record frame images F1a and F2a which do not need to be decimated as is.

As described above, the imaging device 100 according to this embodiment records the first-duration frame images F1a among the frame images for a predetermined duration temporarily stored in the memory device 2 at the time of detection of a capturing instruction and the second-duration frame images F2a imaged in succession at the imager 3 after detection of the capturing instruction in the recorder 9. In addition, the imaging device 100 determines the ratio of the first duration to the second duration while retaining the total of the first and second durations or the total of the first and second durations while retaining the ratio of the first duration to the second duration in response to one type of operation. This facilitates setting of, for example, the time to acquire frame images F1a before a capturing instruction for capturing a crucial moment and time to acquire frame images F2a after the capturing instruction with one type of operation.

More specifically, the ratio of the first duration to the second duration can be set easily while retaining the total of the first and second durations just by moving the slider T on the slide bar B indicating the total of the first and second durations. Likewise, the total of the first and second durations can be set easily while retaining the ratio of the first duration to the second duration just by varying the length of the slide bar B indicating the total of the first and second durations.

The imaging device 100 can combine the frame images F1a acquired for the pre-crucial moment first duration set to an appropriate value and the frame images F2a acquired for the post-crucial moment second duration set to an appropriate value into a single moving image M and record the single moving image M in the recorder 9.

Since the ratio of the first duration to the second duration includes the case where the first duration or the second duration is zero, either the first-duration frame images F1a or the second-duration frame images F2a may be exclusively retrieved.

Before recording, the frame images F1a for the first-duration from a capturing instruction detecting time to the time point the first duration before may be subject to a different process from the frame images F1b for the first specific-duration from the time point the first duration before to a time point a first specific duration before. More specifically, the first-duration frame images F1a may be recorded at shorter intervals than the first specific-duration frame images F1b. This can provide, for example, different display effects between the first-duration frame images F1a and the first specific-duration frame images F1b. In addition, slow-motion replay of the first-duration frame images F1a, which are larger in number than the first specific-duration frame images F1b, enables motion analysis.

Similarly, the second-duration frame images F2a imaged in succession at the imager 3 from the capturing instruction detecting time to a time point a second duration after may be subject to a different process from the second specific-duration frame images F2b imaged in succession at the imager 3 for the second specific duration from the time point the second duration after to a time point a second specific duration after. More specifically, the second-duration frame images F2a are recorded at shorter intervals than the second specific-duration frame images F2b. This can provide, for example, different display effects between the second-duration frame images F2a and the second specific-duration frame images F2b. In addition, slow-motion replay of the second-duration frame images F2a, which are larger in number than the second specific-duration frame images F2b, enables motion analysis.

Furthermore, the first-duration frame images F1a and the second-duration frame images F2a may be recorded in the recorder 9 at first identical time intervals, while the first specific-duration frame images F1b and the second specific-duration frame images F2b may be recorded in the recorder 9 at second identical time intervals.

It should be understood that the embodiments described above are not construed to limit the present invention and can be appropriately modified without departing from the scope of the present invention.

In the above embodiment, for example, a single moving image M is generated by combining the first specific-duration frame images F1b, the first-duration frame images F1a, the second-duration frame images F2a, and the second specific-duration frame images F2b, which is a mere example. Alternatively, a single moving image M may be generated by combining at least the first-duration frame images F1a and the second-duration frame images F2a. In this case, for example, the first-duration frame images F1a may be further divided into smaller groups and the frame images belonging to groups farther from the capturing instruction detecting time are decimated such that a time interval corresponding to reproduction frame rates can be achieved. Similarly, the second-duration frame images F2a may be further divided into smaller groups and the frame images belonging to groups farther from the capturing instruction detecting time are decimated such that a time interval corresponding to reproduction frame rates can be achieved.

The first duration does not necessarily start from the capturing instruction detecting time which is set as the reference. Alternatively, the first-duration frame images F1a may be imaged by the imager 3 before the detection of a capturing instruction. Similarly, the second duration does not necessarily start from the capturing instruction detecting time which is set as the reference. Alternatively, the second-duration frame images F2a may be imaged by the imager 3 after the detection of a capturing instruction.

In the above embodiment, the first-duration frame images F1a and the second-duration frame images F2a have identical time intervals, which is a mere example, and may have different time intervals. Similarly, the first specific-duration frame images F1b and the second specific-duration frame images F2b have identical time intervals, which is a mere example, and they may have different time intervals.

In the above embodiment, the ratio of the first duration to the second duration and the total of the first and second durations are independently determined, which is a mere example, and may be concurrently determined. For example, a two-dimensional plane (not shown) with the X axis for adjusting the ratio of the first duration to the second duration and the Y axis for adjusting the total of the first and second durations may be displayed on the display 6. The setter 5 may determine the ratio of the first duration to the second duration and/or the total of the first and second durations by varying coordinates in the two-dimensional plane in response to a predetermined user operation on the touch panel 7a.

In the above embodiment, the central controller 1 detects a capturing instruction based on a predetermined operation of the operational input unit 7 by a user (for example, the operation of the movie button), which is a mere example and may be modified as appropriate. Alternatively, the central controller 1 may detect a capturing instruction based on voices collected through a microphone (not shown). Alternatively, the central controller 1 may detect a capturing instruction based on a predetermined variation observed in, for example, illuminance during sequential analysis of frame images captured in succession. Alternatively, the central controller 1 may detect a capturing instruction based on the displacement of the imaging device 100 detected by various sensors (not shown) such as an accelerator sensor or angular velocity sensor.

A moving image M file may have control information associated therewith for controlling a reproduction rate in accordance with the frame rate. For example, the control information may specify a reproduction frame rate of 120 fps for frame images F1a and F2a with a frame rate of 120 fps and a reproduction frame rate of 30 fps for frame images F1b and F2b with a frame rate of 30 fps. This control information allows the first-duration frame images F1a and the second-duration frame images F2a, which are larger in number, to be replayed in a normal motion just like a normal moving image M, not in a slow motion.

<Variation 1>

In the above embodiment, the first-duration frame images F1a are recorded at shorter intervals than the first specific-duration frame images F1b, while the second-duration frame images F2a are recorded at shorter intervals than the second specific-duration frame images F2b, which is a mere example. Alternatively, the first-duration frame images F1a may be subject to a different process from the first specific-duration frame images F1b, and the second-duration frame images F2a may be subject to a different process from the second specific-duration frame images F2b.

For example, the first-duration frame images F1a may be combined into a single composite image or the second-duration frame images F2a may be combined into a single composite image. Alternatively, the first-duration frame images F1a and the second-duration frame images F2a may be combined into a single composite image.

Alternatively, the first specific-duration frame images F1b, the above composite image, and the second specific-duration frame images F2b may be combined into a single moving image.

The above-mentioned different processes may include, for example, different image processing, different effects, or color or monochrome images.

Figure 5:
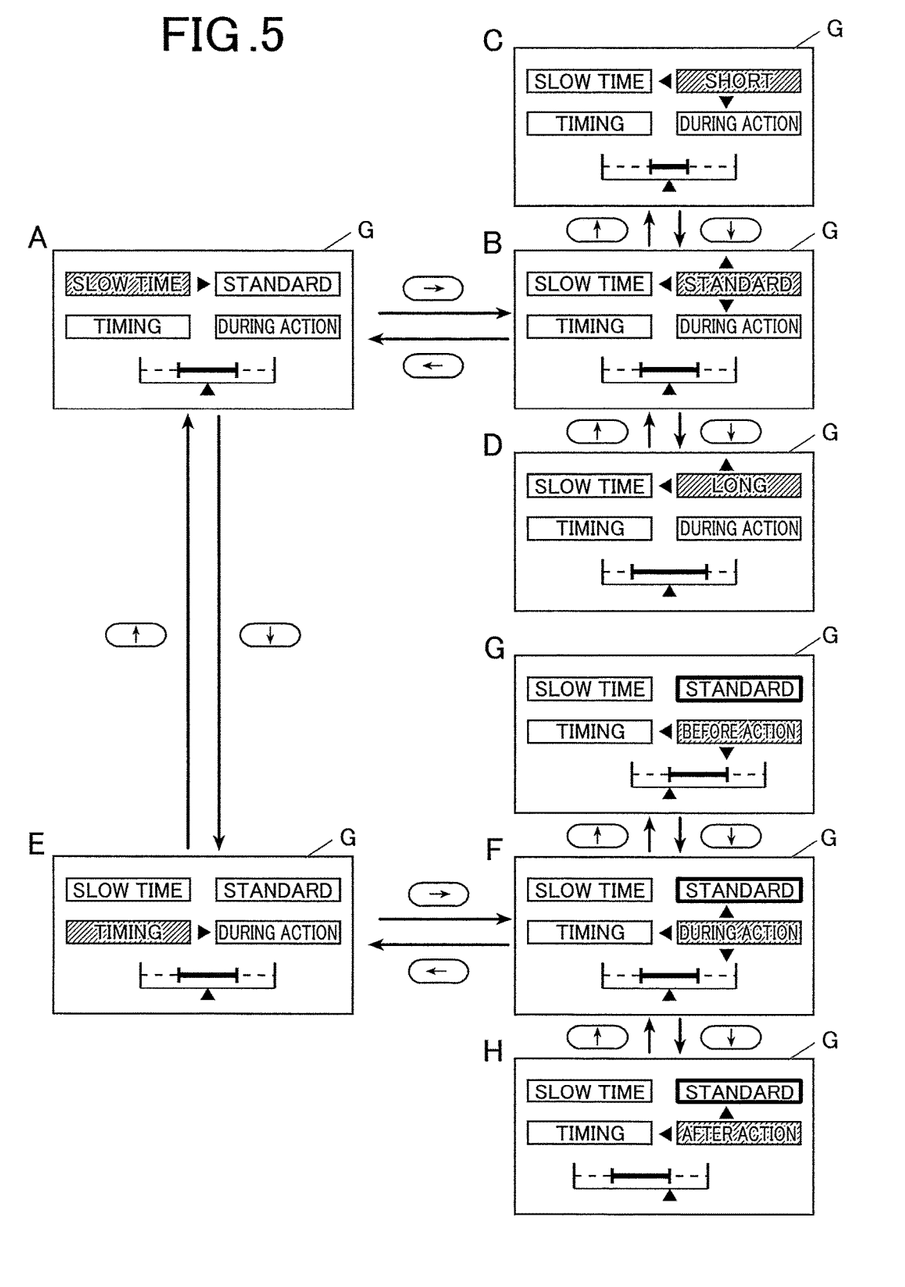
FIG. 5 illustrates another exemplary method for setting the ratio of a first duration to a second duration and the total of the first and second durations.

The configuration of the imaging device 100 according to the above embodiment is a mere example and the imaging device 100 may have a different configuration. For example, the operational input unit 7 is not necessarily equipped with the touch panel 7a and may be equipped with only the cross button for setting the ratio of the first duration to the second duration and/or the total of the first and second durations (see FIGS. 5A to 5H, described below). Alternatively, the operational input unit 7 may be equipped only with the touch panel 7a in place of the cross button to set the ratio of the first duration to the second duration and/or the total of the first and second durations using only the touch panel 7a.

With reference to FIGS. 5A to 5H, a method for setting the ratio of the first duration to the second duration and the total of the first and second durations only with the cross button of the operational input unit 7 is described.

FIGS. 5A to 5D illustrate a method, for setting the total of the first and second durations ("SLOW TIME" in the drawings), while FIGS. 5E to 5H illustrates a method for setting the ratio of the first duration to the second duration ("TIMING" in the drawing).

The "SLOW TIME" has three settings of "LONG", "STANDARD", and "SHORT" in an order from the total of the first and second durations being long.

The "TIMING" has settings: "BEFORE ACTION" with the first duration set to 0/4 and the second duration set to 4/4, "DURING ACTION" with the first duration set to 2/4 and the second duration set to 2/4, and "AFTER ACTION" with the first duration set to 4/4 and the second duration set to 0/4.

To set the "SLOW TIME", for example, a user operates the cross button in the operational input unit 7 to select "SLOW TIME" in a setting screen G displayed in the display panel 6b (see FIG. 5A). At this time, the "SLOW TIME" is set to "STANDARD".

Selecting "STANDARD" in the setting screen G by operating the cross button's right segment (see FIG. 5B) allows the user to set "SLOW TIME". If the user operates the upper segment of the cross button, "SHORT" is selected in the setting screen G (see FIG. 5C). If the user operates the lower segment of the cross button, "LONG" is selected in the setting screen G (see FIG. 5D). The user may operate the upper and lower segments of the cross-button to reset the "SLOW TIME" to "STANDARD" (see FIG. 5B).

Operating the left segment of the cross button while the "SLOW TIME" is set to a desired value of "LONG", "STANDARD" or "SHORT" puts an end to the "SLOW TIME" setting and the screen returns to the setting screen G with the "SLOW TIME" being selected (see FIG. 5A).

To set the "TIMING", for example, a user operates the cross button in the operational input unit 7 (for example, the down segment of the cross button in the state shown in FIG. 5A) to select the "TIMING" in the setting screen G displayed in the display panel 6b (see FIG. 5E). At this time, the "TIMING" is set to "DURING ACTION".

Selecting "DURING ACTION" in the setting screen G with the right segment (see FIG. 5F) of the cross button allows the user to set "TIMING". If a user operates the upper segment of the cross button, "BEFORE ACTION" is selected in the setting screen G (see FIG. 5G). Meanwhile, if the user operates the lower segment of the cross button, "AFTER ACTION" is selected in the setting screen G (see FIG. 5H). The user may operate the upper and lower segments of the cross button to reset the "TIMING" to "DURING ACTION" (see FIG. 5F).

Operating the left segment of the cross button while "TIMING" is set to a desired value of "BEFORE ACTION", "DURING ACTION" or "AFTER ACTION" puts an end to the "TIMING" setting and the screen returns to the setting screen G with the "TIMING" being selected (see FIG. 5E).

Frame images may consist of only the first-duration and second-duration frame images F1a and F2a, i.e., without any first specific-duration and second specific-duration frame images. The ratio of the first duration to the second duration may be determined in response to one type of operation while retaining the total of the first and second durations, or the total of the first and second durations may be determined in response to one type of operation while retaining the ratio of the first duration to the second duration.

Alternatively, the ratio of the first duration to the second duration may be determined in response to one type of operation, while retaining the total of the first duration, the second duration, the first specific duration, and the second specific duration. Alternatively, the total of the first duration, the second duration, the first specific duration, and the second specific duration may be determined in response to one type of operation, while retaining the ratio of the first duration to the second duration.

The first-duration frame images F1a are not necessarily subject to a different process from the first specific-duration frame images F1b. Similarly, the second-duration frame images F2a are not necessarily subject to a different process from the second specific-duration frame images F2b.

<Variation 2>

The above embodiment involves setting of a pre-capturing instruction duration and a post-capturing instruction duration for capturing frame images, which is a mere example. Alternatively, the number of frame images captured before a capturing instruction and the number of frame images captured after a capturing instruction may beset.

In other words, the recording controller 8 records a first number of frame images among a predetermined number of the frame images temporarily stored in the memory device 2 at the time of detection of a capturing instruction and a second number of frame images imaged in succession at the imager 3 after detection of a capturing instruction in the recorder 9. The setter 5 may determine the ratio of the first number to the second number, while retaining the total of the first and second durations in response to one type of operation, or may determine the total of the first and second numbers, while retaining the ratio of the first number to the second number in response to one type of operation. This facilitates setting of, for example, the number of frame images captured before a crucial-moment capturing instruction and the number of frame images captured after the capturing instruction with one type of operation.

Although a detailed description is omitted, a slider may be moved on a slide bar indicating the total of the first and second numbers, substantially similar to the above embodiment. This facilitates setting of the ratio of the first number to the second number, while retaining the total of the first and second numbers. Alternatively, an operation may be performed to vary the length of the slide bar indicating the total of the first and second numbers. This facilitates setting of the total of the first and second numbers, while retaining the ratio of the first number to the second number.

For example, the pre-crucial moment frame images in the first number set to an appropriate value and the post-crucial moment frame images in the second number set to an appropriate value may be combined in a single moving image and recorded in the recorder 9.

In variation 2, since the ratio of the first number to the second number may include the case where the first number or the second number is zero, either the first number of frame images or the second number of frame images may be exclusively retrieved.

Before recording, the first number of frame images from a capturing instruction detecting time to a first number before may be subject to a different process from a first specific number of frame images from the first number before to a first specific number. For example, the first number of frame images may be recorded at shorter intervals than the first specific number of frame images. Alternatively, the first number of frame images may be color and the first specific number of frame images may be monochrome.

Similarly, before recording, the second number of frame images imaged in succession by the imager 3 from the capturing instruction detecting time to a second number may be subject to a different process from a second specific number of frame images imaged in succession by the imager 3 from after reaching the second number to a second specific number. For example, the second number of frame images may be recorded at shorter intervals than the second specific number of frame images. Alternatively, the second number of frame images may be color, while the second specific number of frame images may be monochrome.

In addition, the first number of frame images and the second number of frame images may be recorded in the recorder 9 at first identical time intervals. The first specific number of frame images and the second specific number of frame images may be recorded in the recorder 9 at second identical time intervals.

In the above embodiment, the processor in the central controller 1 may execute predetermined programs.

A program memory device (not shown) contains programs, including a detecting routine, a record controlling routine, and a setting routine that have been preliminarily stored. The detecting routine may instruct the processor in the central controller 1 to detect a capturing instruction. The record controlling routine may instruct the processor in the central controller 1 to record frame images F1*a* for the first duration or in the first number among the frame images for a predetermined duration or in a predetermined number temporarily stored in a temporarily storing means (the memory device 2) at the time of detection of a capturing instruction and the frame images F2*a* for the second duration or in the second number imaged in succession at the imager 3 after detection of the capturing instruction in the recorder 9. The setting routine may instruct the processor in the central controller 1 to set the ratio of the first duration to the second duration or the ratio of the first number to the second number in response to one type of operation, while retaining the total of the first and second durations or the total of the first and second numbers.

Similarly, the detecting routine may instruct the processor in the central controller 1 to detect a capturing instruction. The record controlling routine may instruct the processor in the central controller 1 to record the frame images F1*a* for the first duration or in the first number of the frame images for a predetermined duration or in a predetermined number temporarily stored in a temporarily storing means (the memory device 2) at the time of detection of a capturing instruction and the frame images F2*a* for the second duration or in the second number imaged in succession at the imager 3 after detection of a capturing instruction in the recorder 9. The setting routine may instruct the processor in the central controller 1 to determine the total of the first and second durations or the total of the first and second numbers in response to one type of operation, while retaining the ratio of the first duration to the second duration or the ratio of the first number to the second number.

Computer-readable media containing programs to execute the above functions include ROMs, hard disks, non-volatile memories (such as flash memories), and portable recording media (such as CD-ROMs). Media that provide program data through a predetermined communication line include carrier waves.

Although several embodiments of the present invention have been described above, the present invention should not be construed to limit the scope of the above embodiments and includes the scope of the claims below or the equivalent thereto.

What is claimed is:

1. An imaging device comprising:
   a temporary storage which temporarily cyclically stores images for a predetermined duration or a predetermined number of images imaged in succession through an imager; and
   a processor which detects a capturing instruction;
   wherein the processor performs control to:
   record, in a recorder, temporarily stored images for a first duration or a first number of images before detection of the capturing instruction, and record, in the recorder, images for a second duration or a second number of images imaged in succession through the imager after detection of the capturing instruction;
   variably determine a ratio of the first duration to the second duration or a ratio of the first number to the second number in response to input of a first type of operation of an operational input unit, without changing a total duration of the first duration and the second duration or a total number of the first number of images and the second number of images;
   variably determine the total duration of the first duration and the second duration or the total number of the first number and the second number in response to input of a second type of operation of the operational input unit, without changing the ratio of the first duration to the second duration or the ratio of the first number to the second number; and
   determine the first duration and the second duration or the first number and the second number based on (i) the ratio of the first duration to the second duration or the ratio of the first number to the second number, and (ii) the total duration or the total number,
   wherein in a case in which a last input operation among the first type of operation and the second type of operation is the second type of operation, the processor performs control to determine the first duration and the second duration or the first number and the second number based on the determined total duration or the determined total number determined in response to the input of the second type of operation, without changing the ratio of the first duration to the second duration or the ratio of the first number to the second number, and
   wherein the processor performs control to control the recorder to record images in an amount of the determined first duration and the determined second duration, or the determined first number and the determined second number.

2. The imaging device according to claim 1, wherein the first type of operation to determine the ratio of the first duration to the second duration or the ratio of the first number to the second number without changing the total duration of the first duration and the second duration or the total number of the first number and the second number includes an operation to move a slider on a slide bar indicating the total duration of the first duration and the second duration or the total number of the first number and the second number.

3. The imaging device according to claim 1,
   wherein the second type of operation to determine the total duration of the first duration and the second duration or the total number of the first number and the second number without changing the ratio of the first duration to the second duration or the ratio of the first number to the second number includes an operation to vary a length of a slide bar indicating the total duration of the first duration and the second duration or the total number of the first number and the second number.

4. The imaging device according to claim 1, wherein the ratio of the first duration to the second duration includes a ratio in the case that the first duration or the second duration is zero and the ratio of the first number to the second number includes a ratio in the case that the first number or the second number is zero.

5. The imaging device according to claim 1, wherein the processor performs control to:
   record, in the recorder, images from a time of detecting the capturing instruction to a time point a first duration before or a first number of images before among the images of the predetermined duration as the images for the first duration or the first number of images,
   record, in the recorder, images from the time point the first duration before or the first number before to a time point a first specific duration before or a first specific number before as images of a first specific duration or a first specific number of images, and
   perform different processes between the images of the first duration and the images of the first specific duration and between the first number of images and the first specific number of images.

6. The imaging device according to claim 5, wherein the processor performs control to record the images of the first duration or the first number of images at shorter intervals than the images of the first specific duration or the first specific number of images.

7. The imaging device according to claim 1, wherein the processor performs control to:
record in the recorder images imaged in succession through the imager from a time of detecting the capturing instruction until a second duration elapses or a second number of images is obtained as images of the second duration or the second number of images,
record, in the recorder, images imaged in succession through the imager from after the second duration elapses or the second number is obtained until a second specific duration elapses or a second specific number is obtained as images of a second specific duration or a second specific number of images, and
perform different processes between the images of the second duration and the images of the second specific duration and between the second number of images and the second specific number of images.

8. The imaging device according to claim 7, wherein the processor performs control to record the images of the second duration or the second number of images at shorter intervals than the images of the second specific duration or the second specific number of images.

9. The imaging device according to claim 1, wherein the processor performs control to:
record, in the recorder, the images of the first duration from a time of detecting the capturing instruction to a time point the first duration before among the predetermined duration of images or from the time of detecting the capturing instruction to the first number of images before among the predetermined number of images and the images of the second duration or the second number of images imaged in succession through the imager from the time of detecting the capturing instruction until the second duration elapses or the second number of images is obtained at first identical time intervals, and
record, in the recorder, images of a first specific duration from the time point the first duration before to a time point the first specific duration before among the predetermined duration of images or a first specific number of images from the first number before to the first specific number before among the predetermined number of images and the images of a second specific duration or a second specific number of images imaged in succession by the imager from after the second duration elapsed or the second number is obtained until the second specific duration elapsed or the second specific number is obtained at second identical time intervals.

10. The imaging device according to claim 1, wherein the processor performs control to combine the images of the first duration or the first number of images temporarily stored in the temporary storage at a time of detection of the capturing instruction and images of the second duration or the second number of images imaged in succession by the imager after detection of the capturing instruction into a single moving image and records the single moving image in the recorder.

11. The imaging device according to claim 1, wherein in a case in which the last input operation among the first type of operation and the second type of operation is the first type of operation, the processor performs control to determine the first duration and the second duration or the first number and the second number based on the determined ratio of the first duration to the second duration or the determined ratio of the first number to the second number determined in response to the input of the first type of operation, without changing the total duration or the total number.

12. An imaging method using an imaging device equipped with a temporary storage which temporarily cyclically stores images for a predetermined duration or a predetermined number of images imaged in succession by an imager, the imaging method comprising:
detecting a capturing instruction;
recording, in a recorder, temporarily stored images for a first duration or a first number of images before detection of the capturing instruction, and recording in the recorder images for a second duration or a second number of images imaged in succession through the imager after detection of the capturing instruction;
variably determining a ratio of the first duration to the second duration or a ratio of the first number to the second number in response to input of a first type of operation of an operational input unit, without changing a total duration of the first duration and the second duration or a total number of the first number of images and the second number of images;
variably determining the total duration of the first duration and the second duration or the total number of the first number and the second number in response to input of a second type of operation of the operational input unit, without changing the ratio of the first duration to the second duration or the ratio of the first number to the second number; and
determining the first duration and the second duration or the first number and the second number based on (i) the ratio of the first duration to the second duration or the ratio of the first number to the second number, and (ii) the total duration or the total number,
wherein in a case in which a last input operation among the first type of operation and the second type of operation is the second type of operation, the first duration and the second duration or the first number and the second number are determined based on the determined total duration or the determined total number determined in response to the input of the second type of operation, without changing the ratio of the first duration to the second duration or the ratio of the first number to the second number, and
wherein said recording comprises recording, in the recorder, images in an amount of the determined first duration and the determined second duration, or the determined first number and the determined second number.

13. The imaging method according to claim 12, wherein in a case in which the last input operation among the first type of operation and the second type of operation is the first type of operation, the first duration and the second duration or the first number and the second number are determined based on the determined ratio of the first duration to the second duration or the determined ratio of the first number to the second number determined in response to the input of the first type of operation, without changing the total duration or the total number.

14. A non-transitory computer-readable storage medium having stored thereon a program executable by a computer in an imaging device, the computer being equipped with a temporary storage which temporarily cyclically stores images for a predetermined duration or a predetermined number of images imaged in succession by an imager, the program controlling the computer to perform functions comprising:

detecting a capturing instruction;

recording in a recorder temporarily stored images for a first duration or a first number of images before detection of the capturing instruction, and recording in the recorder images for a second duration or a second number of images imaged in succession through the imager after detection of the capturing instruction;

variably determining a ratio of the first duration to the second duration or a ratio of the first number to the second number in response to input of a first type of operation of an operational input unit, without changing a total duration of the first duration and the second duration or a total number of the first number of images and the second number of images;

variably determining the total duration of the first duration and the second duration or the total number of the first number and the second number in response to input of a second type of operation of the operational input unit, without changing the ratio of the first duration to the second duration or the ratio of the first number to the second number; and     determining the first duration and the second duration or the first number and the second number based on (i) the ratio of the first duration to the second duration or the ratio of the first number to the second number, and (ii) the total duration or the total number,     wherein in a case in which a last input operation among the first type of operation and the second type of operation is the second type of operation, the first duration and the second duration or the first number and the second number are determined based on the determined total duration or the determined total number determined in response to the input of the second type of operation, without changing the ratio of the first duration to the second duration or the ratio of the first number to the second number, and     wherein said recording comprises recording, in the recorder, images in an amount of the determined first duration and the determined second duration, or the determined first number and the determined second number.

15. The non-transitory computer-readable storage medium according to claim 14, wherein in a case in which the last input operation among the first type of operation and the second type of operation is the first type of operation, the first duration and the second duration or the first number and the second number are determined based on the determined ratio of the first duration to the second duration or the determined ratio of the first number to the second number determined in response to the input of the first type of operation, without changing the total duration or the total number.

\* \* \* \* \*